April 24, 1951 R. A. BRADEN 2,550,524

BALANCED MICROWAVE DETECTOR

Filed Aug. 20, 1945 2 Sheets-Sheet 1

INVENTOR.
Rene A. Braden
BY C. D. Tuska
ATTORNEY

BALANCED MICROWAVE DETECTOR

Filed Aug. 20, 1945 2 Sheets-Sheet 2

INVENTOR.
Rene A. Braden
BY
C. D. Tuska
ATTORNEY

Patented Apr. 24, 1951

2,550,524

UNITED STATES PATENT OFFICE 2,550,524

BALANCED MICROWAVE DETECTOR

Rene A. Braden, Princeton, N. J., assignor to Radio Corporation of America, a corporation of Delaware Application August 20, 1945, Serial No. 611,646

5 Claims. (Cl. 250—27)

Figure 1:
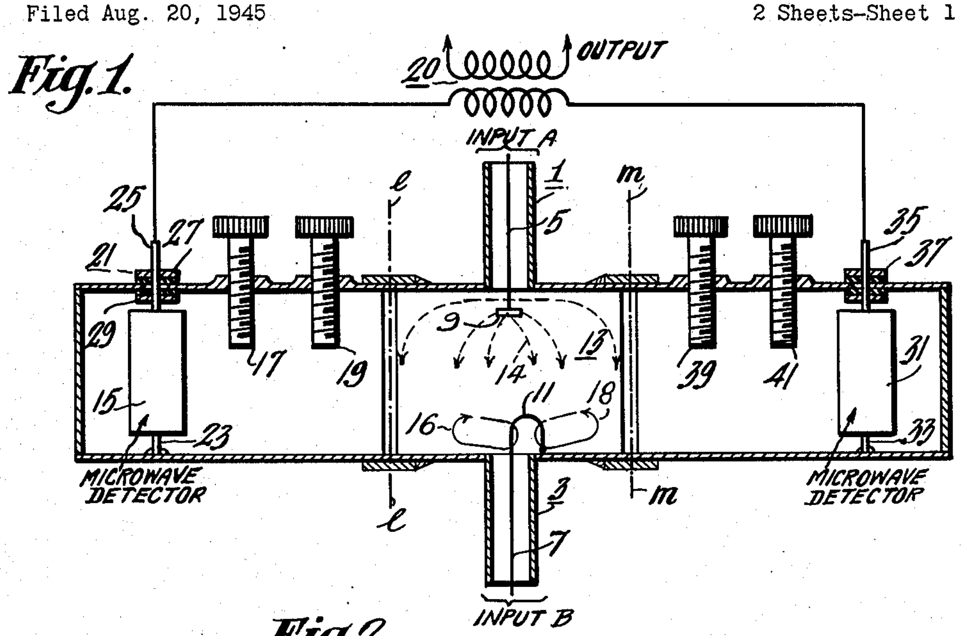

This invention relates generally to microwave receivers and more particularly to balanced microwave detectors for coupling balanced or different input circuits to balanced detector output circuits.

Balanced microwace antenna, detector and amplifier circuits are particularly advantageous at microwave frequencies for the reason that an improved ratio of signal-to-noise levels may be obtained. At microwave frequencies above 3000 megacycles, difficulties in phasing and matching signal levels heretofore have prevented effective use of balanced detector and amplifier circuits. The instant invention comprises several embodiments of balanced microwave detectors which have been found to be completely satisfactory and to require only simple adjustment. Conventional microwave crystal detectors or diodes may be employed since provision is made for matching the detector impedance to the associated networks.

Briefly the instant invention comprises a pair of microwave crystal or thermionic discharge tube detectors each coupled to a waveguide structure or cavity resonator in a manner whereby the detector may be matched to the network surge impedance. Input signals from a balanced input circuit, such, for example, as a dipole antenna, or from two circuits operating at slightly different frequencies, are coupled into the detector waveguides or resonators from separate lines which are terminated and coupled into the detector networks in a manner providing fields in phase opposition. A first embodiment of the invention employs a single waveguide having two detectors coupled thereto at its opposite ends and matched thereto by means of reactive tuning screws or similar devices adjacent to each detector. Input signals from the input circuits are coupled into the waveguide enclosure through two coaxial lines which enter the waveguide at a point equidistant from and intermediate the two detectors. One line is terminated within the waveguide in a capacitive radiating element which provides similarly-phased microwave fields in both sides of the waveguide. The other of the input lines is terminated in a single coupling loop which provides oppositely-phased fields in the two sides of the waveguide. A modification of said first embodiment of the invention utilizes coaxial line principles for phasing the input signals.

The second embodiment of the invention utilizes two separate cavity resonators each enclosing one of the microwave detectors and including means, such as tuning screws or tuning plugs, for tuning the cavity resonators separately. The input signal lines are each terminated in a T-junction. The two arms of each of the T-junctions are terminated by coupling loops in different ones of the cavity resonators. One T-junction is terminated by similarly-phased coupling loops in both of the cavity resonators and the other T-junction is terminated by oppositely-phased coupling loops in each of the two resonators.

A modification of the second embodiment of the invention employs a lossy line for the two arms of one of the T-junctions whereby reaction between the cavity resonators is effectively prevented. The lossy T-junction line may comprise a section of coaxial line having a lossy dielectric such, for example, as conductive rubber.

Among the objects of the invention are to provide an improved method of and means for detecting microwave signals in a balanced detector circuit. A further object is to provide an improved balanced microwave detector for frequencies in excess of 3000 megacycles. An additional object is to provide a balanced microwave detector comprising a waveguide network terminated at each end by a microwave detector and having input lines terminated in said waveguide equidistant from and intermediate said detectors by elements providing oppositely-phased electric fields within the two portions of said waveguide adjacent said detectors. A further object is to provide means for matching the microwave detectors in such a waveguide coupling network to the surge impedance of said waveguide. An additional object is to provide a balanced microwave detector utilizing a coaxial line for deriving the desired phasing of input signals to be detected.

Another object is to provide a balanced microwave detector comprising two cavity resonators each enclosing a microwave detector and including means for tuning said resonators, and a pair of input signal lines each terminated in T-junctions both of which are coupled into each of said resonators by means of similarly-phased and oppositely-phased coupling elements. An additional object is to provide a balanced microwace detector employing two cavity resonators enclosing separate microwave detectors, and having input lines each terminated in T-junctions both of which are coupled cophasally and in opposite phase respectively into both of said cavity resonators, and attenuating means in one of said T-junctions effectively to prevent reaction between said cavity resonators.

Figure 2:
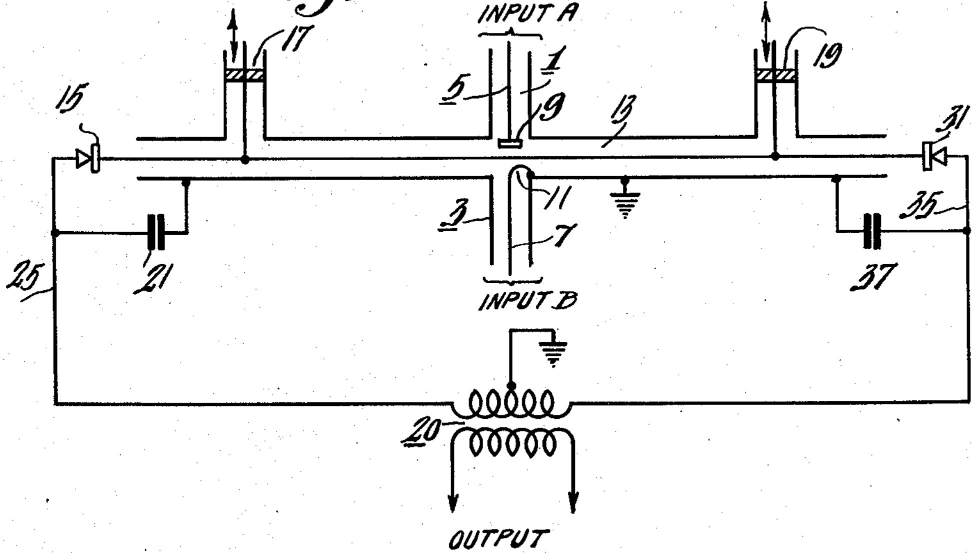
Figures 3, 4:
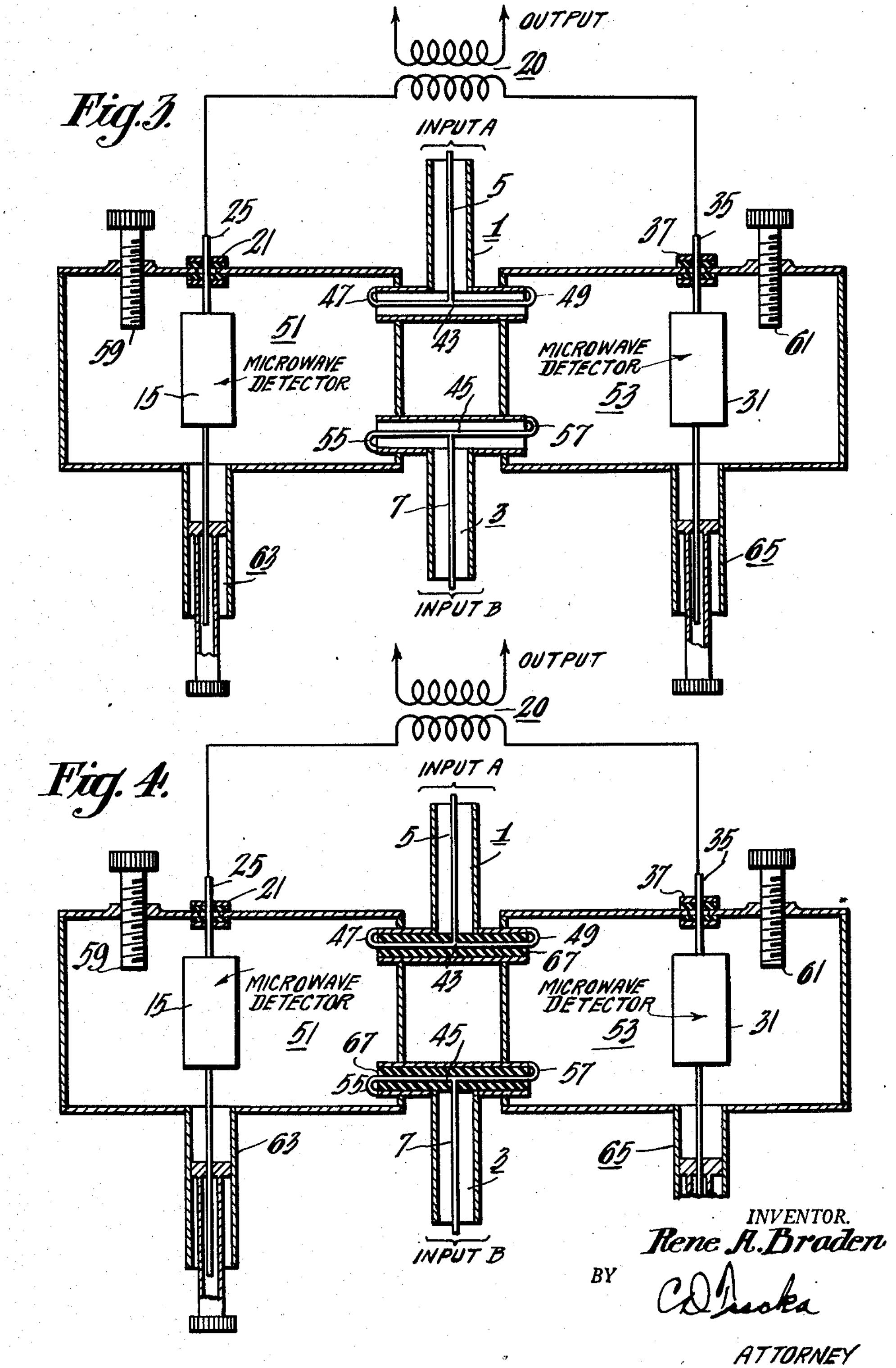

The invention will be described in greater detail by reference to the accompanying drawing in which Figure 1 is a schematic layout of one embodiment of the invention, Figure 2 is a schematic layout of a modification of said first embodiment of the invention, Figure 3 is a schematic layout of a second embodiment of the invention, and Figure 4 is a schematic layout of a modification of said second embodiment of the invention. Similar reference characters are applied to similar elements throughout the drawing.

Referring to Figure 1, a pair of input signal coaxial lines 1, 3 have their inner conductors 5, 7 terminated in a capacitive plate 9 and a coupling loop 11, respectively, within the center portion of waveguide section 13. The capacitive plate 9 excites similarly-phased electric fields 14 in both ends of the waveguide section 13. The coupling loop 11 excites oppositely-phased fields 16, 18 in both ends of the waveguide section 13.

This arrangement may be used for all the purposes for which balanced detectors are used. For example, input A might be a receiving antenna, and input B a local or beating oscillator (or vice versa). Suitable matching means would be provided for A, but not necessarily for B. By reason of the opposing polarities of the two detectors with respect to the output transformer, there is no output signal corresponding to amplitude modulation of either signal. Thus, noise, and power supply ripple modulation of the local oscillator are balanced out. However, because of the reversed radio frequency phase at one detector compared with the other, the heterodyne output component of one detector is reversed and the two detected signals add instead of balancing out. Thus a pure beat signal is obtained, free from noise which modulates the local oscillator. Also, due to the phasing of the two input coupling means, cross-coupling between the two input circuits is minimized, permitting either or both input circuits to be matched to the waveguide without objectionable loading of one input circuit by the other.

A first microwave detector 15 is inserted within, and coupled to, the waveguide section 13 adjacent one end thereof. The microwave detector 15 may comprise a microwave crystal of the type described in the copending application of Wendell L. Carlson, Serial No. 507,755 filed October 26, 1943, now U. S. Patent No. 2,427,087, granted September 9, 1947, or it may be any type of thermionic discharge tube or other microwave-responsive device known in the art. The detector 15 may be matched to the surge impedance of the waveguide section 13 by means of tuning screws 17, 19 disposed adjacent thereto intermediate the detector and the center portion of the waveguide section. Detected signals derived from the detector 15 may be coupled to an external circuit 20 by a conductor which is by-passed by a capacitive coupling 21 through the wall of the waveguide. One terminal 23 of the detector 15 is grounded to the inner surface of the waveguide, and the other terminal 25 passes through an aperture in the waveguide wall and includes capacitive electrodes 27, 29 which are disposed closely adjacent to the waveguide walls forming said aperture to provide the by-pass element 21.

A second microwave detector 31, of identical type to the detector 15, is disposed adjacent to the opposite end of the waveguide section 13. It includes a grounded connection 33 and an ungrounded connection 35 which passes through a second capacitive by-pass element 37 to a second external circuit. The two output conductors 25 and 35 may be connected to any type of balanced detector output circuit such, for example, as the input circuits of an intermediate frequency or audio frequency amplifier. The waveguide 13 should be proportioned to provide efficient transmission at the received microwave frequency. Tuning screws or tuning plugs 39, 41 may be employed to match the second microwave detector 31 to the surge impedance of the waveguide 13.

Exact matching of each detector to the waveguide surge impedance is necessary so that no microwave energy will be reflected from one end of the waveguide section to the other end. Reflected signals would disturb the phase relations provided by the capacitive and inductive input signal couplings described heretofore.

It should be understood that a similar arrangement may utilize a single coaxial transmission line in place of the waveguide structure described heretofore, and that the coaxial line may be tuned by tuning stubs or other devices known in the art.

The matching adjustments for the detectors are preferably made on one detector at a time, the other detector being replaced temporarily with a non-reflecting load such, for example, as a tapered lossy dielectric plug inserted into a matching waveguide which may be connected at the planes *l—l* or *m—m* to the section of the waveguide 13 to be adjusted. The waveguide should be of telescopic design permitting it to be taken apart at these planes. After each detector has been matched by suitable adjustment of the tuning screws adjacent thereto, the two matched sections of the waveguide are connected together. Preferably the matched waveguide sections connected at the planes *l—l* or *m—m* during the matching procedure should include wave reflection measuring elements such, for example, as wave detectors connected to movable probes longitudinally adjustable within slots therein.

Figure 2 illustrates a fully coaxial line modification of the device described by reference to Figure 1. Similar elements adapted to coaxial line technique are indicated by primed reference numerals corresponding to elements for the same purpose in Figure 1.

Figure 3 employs two input signal coaxial lines 1 and 3, which are terminated in line T-junctions 43, 45, respectively. The end of the line T-junction 43 is terminated in two similarly-phased coupling loops 47, 49, which extend into two cavity resonators 51, 53, respectively. The line T-junction 45 is terminated in a pair of oppositely-phased coupling loops 55, 57 which extend respectively into the cavity resonators 51 and 53. The first cavity resonator 51 may be tuned, for example, by means of a tuning screw 59. The second cavity resonator 53 may be tuned, for example, by means of a second tuning screw 61.

The first microwave detector 15, of any of the types well known in the art, or as described heretofore, is enclosed within the first cavity resonator 51, and is matched by a first tunable line stub 63. Similarly the second microwave detector 31, of similar type, is enclosed within the second cavity resonator 53, and is matched by a second tunable line stub 65. Signals from the first input line 1 are coupled into both cavity resonators 51, 53 in the same phase. Signals from the second input line 3 are coupled into both cavity resonators 51, 53 in opposite phase. If desired, the input coupling loops 47, 49 and 55, 57 may be of different sizes. The microwave detectors 15 and 31 may include capacitive by-pass elements 21 and 37, respectively, in their output leads in the same manner as described heretofore for the device of Figure 1.

A modification of the second embodiment of the invention is illustrated in Figure 4. The modified system is identical to the structure illustrated in Figure 3 with the exception that one or both of the lines 43, 45 forming the T-junctions provide a high-attenuation wave path between the cavity resonators 51 and 53, effectively to prevent reaction therebetween which would disturb the phase relations of the enclosed fields. The T-junctions may be made to provide the required attenuation by employing a lossy dielectric 67, in one or both of said junction lines, such as conductive rubber, as indicated by the shaded dielectric in the T-junction line 45.

Thus the invention described comprises several embodiments and modifications of an improved balanced detector for microwave reception wherein proper phase relations are established in a waveguide, coaxial line or cavity resonator structure in response to input signals derived from a pair of input lines.

I claim as my invention:

1. A balanced microwave detector for a pair of signal sources comprising a pair of waveguide sections, a pair of wave detecting means disposed within and adjacent to opposite ends of said waveguide sections, a first input signal source aperiodically coupled inductively through said waveguide sections to both of said detecting means for coupling signals thereto in phase opposition, a second input signal source aperiodically coupled capacitively in-phase through said waveguide sections to both of said detecting means, and means for connecting said detecting means to a utilization circuit.

2. A balanced microwave detector for a pair of signal sources comprising an elongated waveguide section, a pair of wave detecting means disposed within and adjacent to opposite ends of said waveguide section, means closing the opposite ends of said section, a first input signal source aperiodically inductively coupled through said waveguide section to both of said detecting means for coupling signals thereto in phase opposition, a second input signal source aperiodically capacitively coupled in-phase through said waveguide section to both of said detecting means, and means for connecting said detecting means to a utilization circuit.

3. A balanced microwave detector for a pair of signal sources comprising an elongated waveguide section, a pair of wave detecting means disposed within and adjacent to opposite ends of said waveguide section, means closing the opposite ends of said section, tuning means disposed in said waveguide section for substantially matching each of said detecting means at the operating microwave frequency, a first input signal source aperiodically inductively coupled through said waveguide section to both of said detecting means for coupling signals thereto in phase opposition, a second input signal source aperiodically capacitively coupled in-phase through said waveguide section to both of said detecting means, and means for connecting said detecting means to a utilization circuit.

4. A balanced microwave detector for a pair of signal sources comprising an elongated waveguide section, a pair of wave detecting means disposed within and adjacent to opposite ends of said waveguide section, means closing the opposite ends of said section, microwave by-pass means connected to each of said detecting means, a first input signal source terminated by a coupling loop disposed within said waveguide section intermediate the ends thereof and aperiodically inductively coupled in phase opposition through said waveguide section to both of said detecting means, a second input signal source terminated within said waveguide section intermediate said ends thereof to provide in-phase aperiodic capacitive coupling through said waveguide section to both of said detecting means, and means for connecting said detecting means to a utilization circuit.

5. Apparatus according to claim 4 including separate tuning means disposed within said waveguide section intermediate said detecting means and said signal source coupling means for separately matching said detecting means at the operating microwave frequency.

RENE A. BRADEN.

REFERENCES CITED

The following references are of record in the file of this patent:

UNITED STATES PATENTS

| Number | Name | Date |
|---|---|---|
| 2,142,159 | Southworth | Jan. 3, 1939 |
| 2,231,997 | Guanella | Feb. 18, 1941 |
| 2,253,589 | Southworth | Aug. 26, 1941 |
| 2,311,520 | Clifford | Feb. 16, 1943 |
| 2,382,693 | Dallenbach et al. | Aug. 14, 1945 |
| 2,410,122 | Mercer et al. | Oct. 29, 1946 |
| 2,413,939 | Benware | Jan. 7, 1947 |
| 2,436,828 | Ring | Mar. 2, 1948 |